US011919311B2

(12) United States Patent
Takehana

(10) Patent No.: US 11,919,311 B2
(45) Date of Patent: Mar. 5, 2024

(54) INKJET PRINTER

(71) Applicant: MIMAKI ENGINEERING CO., LTD., Nagano (JP)

(72) Inventor: Soichiro Takehana, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 234 days.

(21) Appl. No.: 17/761,189

(22) PCT Filed: Nov. 16, 2020

(86) PCT No.: PCT/JP2020/042569
§ 371 (c)(1),
(2) Date: Mar. 16, 2022

(87) PCT Pub. No.: WO2021/100646
PCT Pub. Date: May 27, 2021

(65) Prior Publication Data

US 2022/0363065 A1 Nov. 17, 2022

(30) Foreign Application Priority Data

Nov. 20, 2019 (JP) ................................ 2019-209396
Nov. 20, 2019 (JP) ................................ 2019-209397

(51) Int. Cl.
*B41J 2/17* (2006.01)
*B41J 2/14* (2006.01)
(Continued)

(52) U.S. Cl.
CPC ......... *B41J 2/1707* (2013.01); *B41J 2/14088* (2013.01); *B41J 2/18* (2013.01); *B41J 11/00214* (2021.01); *B41J 2202/12* (2013.01)

(58) Field of Classification Search
CPC . B41J 2/175; B41J 2/17509; B41J 2/18; B41J 11/00214; B41J 2/14088;
(Continued)

(56) References Cited

U.S. PATENT DOCUMENTS 11,312,135 B2 * 4/2022 Sasaki ........................ B41J 2/18
11,433,671 B2 * 9/2022 Hagiwara ................. B41J 2/18
(Continued)

FOREIGN PATENT DOCUMENTS

JP 2006213061 8/2006
JP 2007313654 12/2007

OTHER PUBLICATIONS

"International Search Report (Form PCT/ISA/210) of PCT/JP2020/042569," dated Feb. 2, 2021, with English translation thereof, pp. 1-4.

*Primary Examiner* — An H Do
(74) *Attorney, Agent, or Firm* — JCIPRNET

(57) ABSTRACT

Since ink is not heated at a protrusion connecting an ink supplying device and a print head chip or the like, the viscosity of the ink increases, and the fluidity may not be maintained in some cases. An inkjet printer 1 for solving the above problem includes an inkjet head 300 that ejects ink; a protrusion 310 provided to protrude from the inkjet head 300 and configured to circulate the ink to the inkjet head 300; and an ink flow path portion 6 that supplies the ink to the protrusion 310; where the ink flow path portion 6 includes an ink warming block 200 that heats the ink, and a conducting portion 210 that is formed in the ink warming block 200 itself or separately from the ink warming block 200 and through which heat from the ink warming block 200 is conducted is adjacently disposed outside the protrusion 310.

16 Claims, 8 Drawing Sheets

(51) Int. Cl.
*B41J 2/18* (2006.01)
*B41J 11/00* (2006.01)

(58) Field of Classification Search
CPC ...... B41J 2/1707; B41J 2/195; B41J 2202/12; B41J 2/2132
See application file for complete search history.

(56) References Cited

U.S. PATENT DOCUMENTS

| | | | | |
|---|---|---|---|---|
| 11,498,331 | B2 * | 11/2022 | Yaginuma | B41J 2/1404 |
| 2010/0045728 | A1 * | 2/2010 | Suzuki | B41J 2/175<br>347/17 |

* cited by examiner

INKJET PRINTER

CROSS-REFERENCE TO RELATED APPLICATION

This application is a 371 application of the International PCT application serial no. PCT/JP2020/042569, filed on Nov. 16, 2020, which claims the priority benefits of Japan Patent Application No. 2019-209397, filed on Nov. 20, 2019, and Japan Patent Application No. 2019-209396, filed on Nov. 20, 2019. The entirety of each of the above-mentioned patent applications is hereby incorporated by reference herein and made a part of this specification.

TECHNICAL FIELD

The present invention relates to an inkjet printer.

The present invention relates to an inkjet printer equipped with a pair of inkjet heads.

BACKGROUND ART

Printing performed by ejecting ink having high viscosity in the inkjet printer is performed by heating the ink in a flow path for supplying the ink to the inkjet head to lower the viscosity and improve the fluidity, thereby supplying the ink to the inkjet head.

Patent Literature 1 describes a technique of an inkjet print head package including an ink supplying unit including a preheating plate, a print head chip or the like including an auxiliary heater, and an ink hose connecting an ink supplying device and the print head chip or the like.

Conventionally, an ink supplying device that supplies ink to a print head chip has been known (see e.g., Patent Literature 1). The ink supplying device includes a preheating plate and a preheating heater, where the preheating plate and the preheating heater heat ink to be supplied to the print head chip. The ink heated by the ink supplying device is supplied to the print head chip. The print head chip ejects the ink supplied through an ink supply port through a plurality of nozzles.

CITATION LIST

Patent Literature

Patent Literature 1: Japanese Unexamined Patent Publication No. 2006-213061

SUMMARY OF INVENTION

Technical Problems

Since the ink is not heated at the protrusion connecting the ink supplying device and the print head chip or the like, the viscosity of the ink increases, and the fluidity may not be maintained in some cases.

The present invention has been made in view of such a problem.

An inkjet head such as a general print head chip moves in a main scanning direction with respect to a recording medium, and a plurality of nozzles are in a nozzle row arranged side by side in a sub scanning direction orthogonal to the main scanning direction. In some inkjet heads, an ink supply port is provided on one side in the sub scanning direction with respect to the nozzle row. Furthermore, in order to lengthen the nozzle row in the sub scanning direction, two nozzle rows may be arranged in the sub scanning direction using two inkjet heads. In this case, the two ink supply ports provided in the two inkjet heads are respectively generally arranged on one side in the sub scanning direction with respect to the nozzle row.

Here, in the nozzle row, the nozzle on one side in the sub scanning direction, which is a side closer to the ink supply port, may not have the temperature of the ink immediately after the start of ejection of ink stable, as compared with the nozzle on the other side in the sub scanning direction, which is a side farther from the ink supply port. This is because the temperature distribution of the ink becomes non-uniform when the ink in the head is warmed by the ink warming heater provided in the inkjet head. Therefore, the nozzle on the side closer to the ink supply port has a larger variation in the ejection speed of the ink than the nozzle on the side farther from the ink supply port immediately after the start of ejection of the ink. Therefore, the nozzle on the side closer to the ink supply port has a larger variation in the ejection speed of the ink than the nozzle on the side farther from the ink supply port immediately after the start of ejection of the ink.

Of the two nozzle rows arranged in the sub scanning direction, in one nozzle row, the nozzle on the other nozzle row side is a nozzle on the side closer to the ink supply port, and in the other nozzle row, the nozzle on the one nozzle row side is a nozzle on the side farther from the ink supply port. This is because the two ink supply ports provided in the two inkjet heads are arranged on the same side in the sub scanning direction with respect to each nozzle row. Therefore, since the two nozzle rows are combined such that the nozzle on the side closer to the ink supply port and the nozzle on the side farther from the ink supply port are continuous or overlap in the sub scanning direction, the nozzle having a large variation in the ink ejection speed and the nozzle having a small variation in the ink ejection speed are combined. As a result, stripes due to shading, that is, banding is likely to occur, and there is a possibility that image quality may degrade.

The present invention thus provides an inkjet printer capable of improving image quality.

Solutions to Problems

An inkjet printer for solving the above problem includes an inkjet head that ejects ink; a protrusion provided to protrude from the inkjet head and configured to circulate the ink to the inkjet head; and an ink flow path portion that supplies the ink to the protrusion; where the ink flow path portion includes an ink warming block that heats the ink, and a conducting portion that is formed in the ink warming block itself or separately from the ink warming block and through which heat from the ink warming block is conducted is adjacently disposed outside the protrusion.

An inkjet printer for solving the above problem includes an inkjet head that ejects ink; a protrusion provided to protrude from the inkjet head and configured to circulate the ink to the inkjet head; and an ink flow path portion that circulates the ink to the protrusion; where the ink flow path portion includes an ink warming block that heats the ink, the ink warming block includes a warming flow path for circulating the ink, the protrusion includes a protruding flow path for circulating the ink therein, and a flow path cross-sectional area of the protruding flow path is smaller than a flow path cross-sectional area of the warming flow path.

An inkjet printer of the present invention relates to an inkjet printer that performs printing by relatively moving a recording medium and an inkjet head that ejects ink onto the recording medium, where the inkjet head includes a nozzle row in which a plurality of nozzles are arranged in a row in the same direction; an ink supply port formed to be biased toward one end portion side of the nozzle row; and an ink warming heater that warms the ink; the inkjet printer includes a pair of the inkjet heads; and the pair of inkjet heads are arranged so as to be shifted in position in the same direction such that such that compared to one end portions of the nozzle rows, the other end portions are proximate to each other.

According to this configuration, the nozzles on the side farther from the ink supply port of the two nozzle rows arranged with the positions shifted can be brought proximate to each other. That is, nozzles having a small variation in ink ejection speed can be brought proximate to each other. Therefore, generation of streaks due to shading, that is, banding can be suppressed, and the image quality of the target object can be improved.

A warming block is preferably further provided that is provided on an upstream side of each of the inkjet heads in the circulating direction of the ink and warms the ink supplied to the ink supply port.

According to this configuration, since the ink to be supplied to the inkjet head can be warmed, non-uniformity of the temperature of the ink in the head can be suppressed.

When performing printing operation on the recording medium at the same time, the pair of inkjet heads preferably have the other end portions proximate to each other so that the respective nozzle rows of the pair of inkjet heads are regarded as a continuous nozzle row.

According to this configuration, printing can be performed on the recording medium by a long nozzle row in which a pair of nozzle rows is continuous using a pair of inkjet heads.

Preferably, a controller is further provided that controls a printing operation of the inkjet head; where the controller causes each of the inkjet heads to perform printing on the print medium by a multi-pass method of performing a plurality of main scans for a plurality of print passes with respect to each position of the recording medium, and causes each of the inkjet heads to eject ink droplets to a pixel designated by mask data using mask data, the mask data being data designating a pixel to which ink droplets are to be ejected in each of the plurality of print passes performed on each position of the recording medium; and in the mask data, a nozzle usage frequency on the other end portion side proximate to each other of the nozzle rows of the pair of inkjet heads becomes high, and a nozzle usage frequency on the one end portion side of the nozzle row becomes low.

According to the configuration, the nozzle having a high nozzle usage frequency can be the nozzle having a small variation in the ink ejection speed. Therefore, the usage frequency of the nozzle having high ink ejection stability can be increased, and on the other hand, the usage frequency of the nozzle having low ink ejection stability can be reduced, so that the ink can be stably ejected onto the recording medium.

Furthermore, preferably, the pair of inkjet heads have the same structure, and are arranged point-symmetrically with a phase differed by 180 degrees about a symmetry point in a plane where the inkjet heads and the recording medium relatively move.

According to this configuration, since the pair of inkjet heads can be made to have the same structure by arranging the pair of inkjet heads point-symmetrically, an increase in device cost can be suppressed.

The ink preferably is an ultraviolet-curable ink that cures by ultraviolet light.

According to this configuration, even when the ink is the ultraviolet-curable ink, the image quality of the target object can be improved.

Effect of the Invention

According to the inkjet printer of the present invention, as the protrusion is overheated through the heat transfer portion, an increase in ink viscosity at the protrusion is suppressed. Thus, the fluidity of the ink can be maintained.

DESCRIPTION OF EMBODIMENT

Hereinafter, an example of the present invention will be described with reference to the drawings. Note that the present invention is not limited only to the present examples.

<Inkjet Printer>

Figure 1:
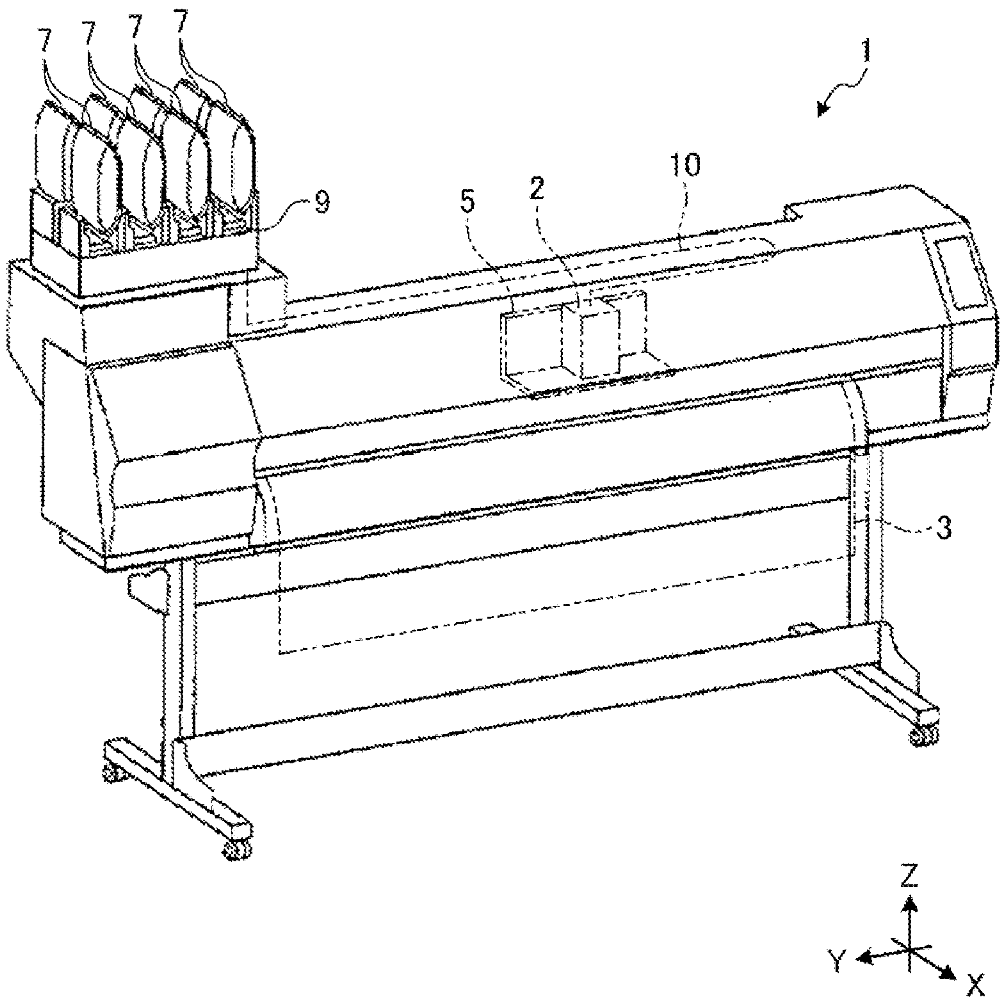
FIG. 1 is a perspective view of an inkjet printer according to the present example.
Figure 2:
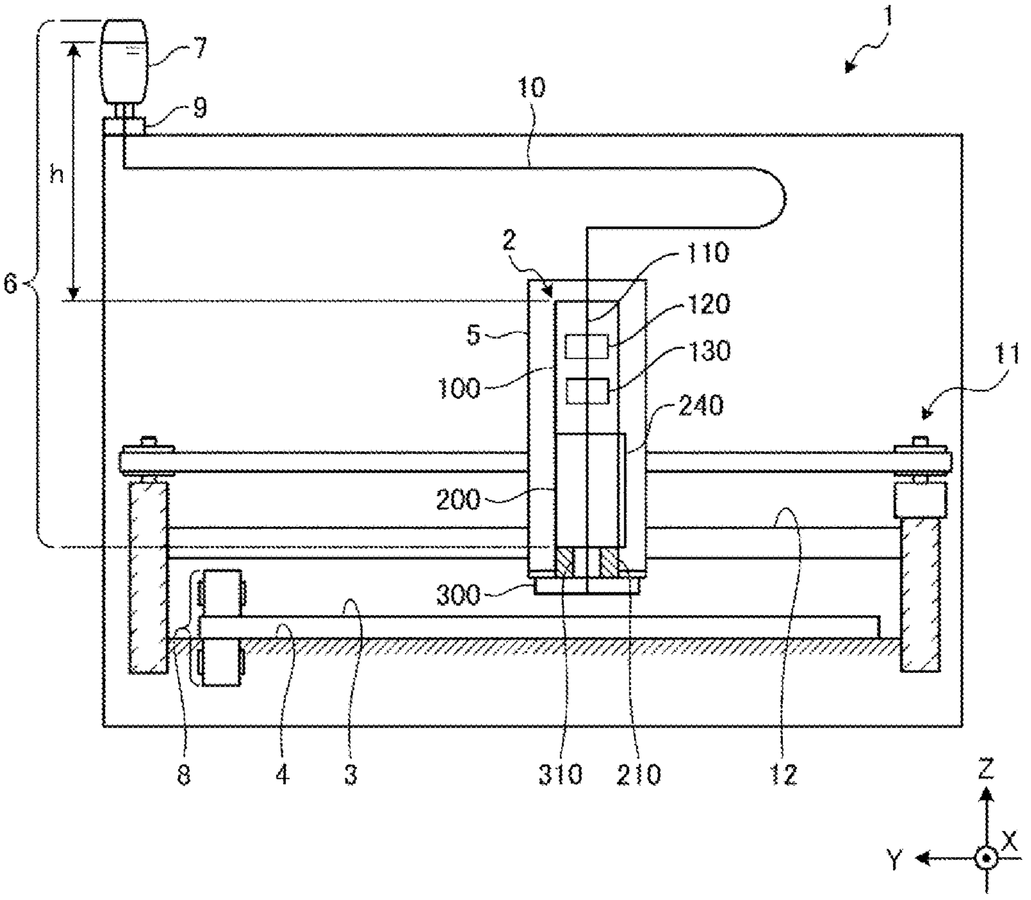
FIG. 2 is a schematic front view of a carriage of the inkjet printer according to the present example.

Hereinafter, an inkjet printer according to the present example will be described with reference to FIGS. 1 and 2. FIG. 1 is a perspective view of an inkjet printer according to the present example. FIG. 2 is a schematic front view for explaining a configuration of the main part of the inkjet printer shown in FIG. 1.

The inkjet printer 1 (hereinafter referred to as a "printer 1") ejects UV (UV, Ultra Violet) ink from an inkjet head 300 (hereinafter referred to as "head 300") onto a print medium 3 to perform printing. As illustrated in FIG. 2, the printer 1 includes a head unit 2, a platen 4, a carriage 5, an ink storage 7, a storage connector 9, a hose 10, and a carriage driver 11.

In the following description, a feeding direction of the print medium 3 is an X direction, a moving direction of the head 300 is a Y direction, and a direction orthogonal to the X direction and the Y direction is a Z direction. In the X direction, a front direction of the printer 1 in FIG. 1 is an X+ direction, and a back direction of the printer 1 is an X− direction. In the Y direction, a left side direction of the printer 1 in FIG. 1 is a Y+ direction, and a right side direction of the printer 1 is a Y− direction. Furthermore, in the Z direction, a direction opposite to a vertical direction of the printer 1 in FIG. 1 is a Z+ direction, and a vertical direction of the printer 1 is a Z− direction. Moreover, a plane constituted by the X direction and the Y direction is referred to as an XY plane. A direction along the XY plane is referred to as a horizontal direction.

As shown in FIG. 1, the ink storage 7 has an outflow port downwardly attached with respect to the storage connector 9. The ink in the ink storage 7 circulates through the hose 10 attached to the storage connector 9 and is fed to a pressure controller 100 mounted on the carriage 5. Here, the height of the ink storage 7 attached to the storage connector 9 is a higher position than the pressure controller 100. The ink storage 7 and the storage connector 9 may be mounted on the carriage 5.

The ink storage 7 is made of a flexible material. The ink storage 7 is airtightly attached to the storage connector 9. The ink storage 7 is configured to keep the pressure of the internal air constant when the remaining amount of ink is decreased.

The ink supplied from the storage connector 9 including the ink storage 7 contains UV ink. The viscosity of the UV ink has high temperature dependency, and has high viscosity at normal temperature, but the viscosity lowers by heating. That is, the fluidity of the UV ink can be improved by heating. Here, the UV ink is an ink having a property of being cured when irradiated with UV.

The UV ink contains a pigment that is a colorant, a monomer that is a material polymerized to form a film, a photopolymerization initiator that absorbs UV light to start a polymerization reaction of the monomer, and an adjuster that adjusts the ink after printing, and has ultraviolet curability. When the UV ink is irradiated with ultraviolet light, a photopolymerization initiator reacts to start a polymerization reaction of a monomer, and the UV ink is cured.

The hose 10 has one end connected to the storage connector 9 and the other end connected to the pressure controller 100 of the head unit 2. The hose 10 bends and follows in the horizontal direction as the carriage 5 moves in the Y+ direction or the Y− direction.

The head unit 2 ejects ink onto the platen 4, described later. As illustrated in FIG. 2, the head unit 2 includes the pressure controller 100, an ink warming block 200, a conducting portion 210, a head 300, and a protrusion 310. The head unit 2 is mounted on the carriage 5 described later.

The pressure controller 100 causes the ink supplied from the ink storage 7 to circulate to the ink warming block 200. The pressure controller 100 includes a control flow path 110 for circulating ink, a buffer 120, and a suck back 130. The pressure controller 100 is disposed below the ink storage 7. Here, the ink is circulated from the ink storage 7 to the pressure controller 100 by the water head difference h between the height of the liquid level of the ink in the ink storage 7 and the height of the ink at the inlet of the pressure controller 100 illustrated in FIG. 2.

When circulating the ink, if the flow rate of the ink supplied from the ink storage 7 is larger than the amount of ink ejected from the head 300, the pressure controller 100 increases the volume of the buffer 120 to hold the surplus ink in the buffer. If the flow rate of the ink supplied from the ink storage 7 is smaller than the amount of ink ejected from the head 300, the pressure controller 100 decreases the volume of the buffer 120 to additionally supply the ink held in the buffer. This allows a sudden increase and decrease in the amount of ink ejected from the head 300. Furthermore, when the ejection of ink from the head 300 is not performed, the pressure controller 100 performs an operation of slightly pulling back the ink between the pressure controller 100 and the head 300 by increasing the volume of the buffer 120 by the suck back 130.

<Ink Warming Block>

Figure 3:
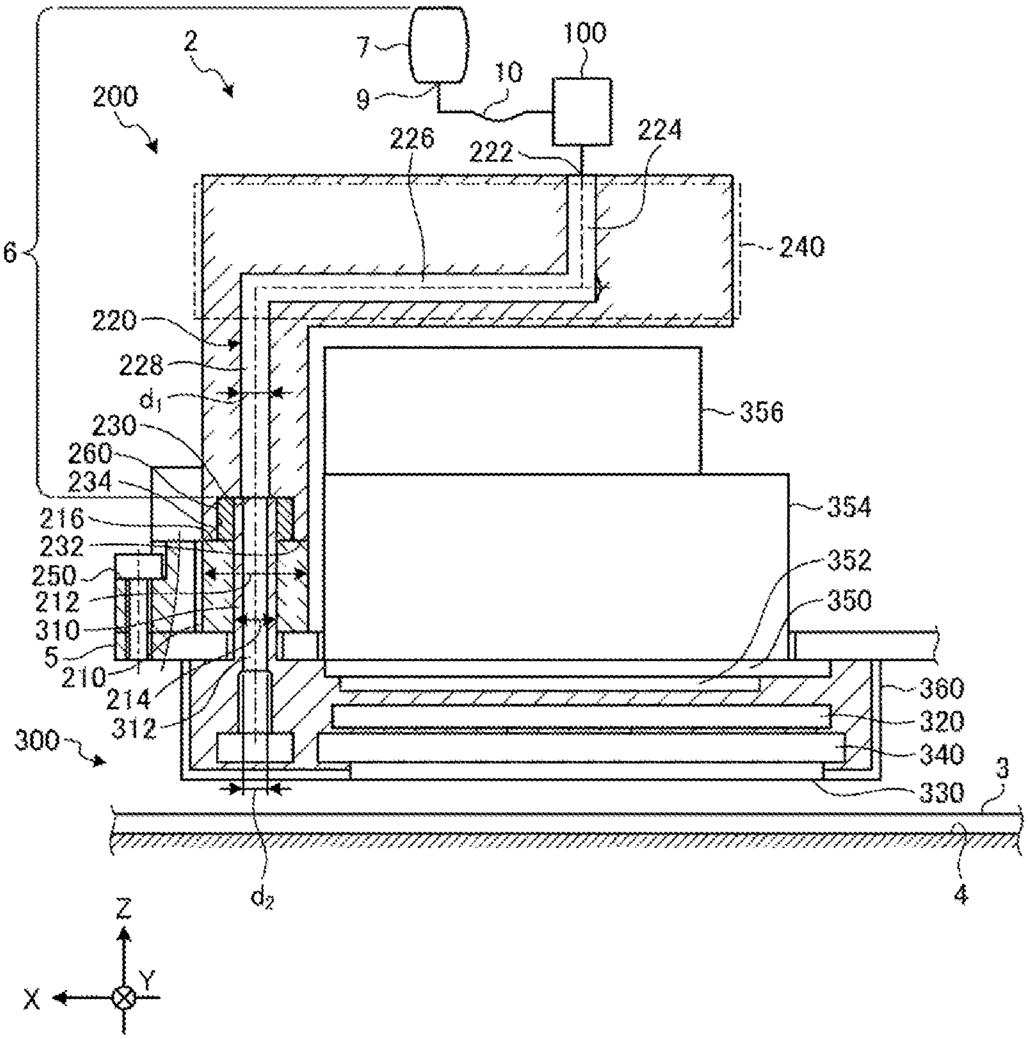
FIG. 3 is a right side cross-sectional view of a main part of the inkjet printer according to the present example.

The ink warming block 200 heats the ink supplied from the pressure controller 100. As illustrated in FIG. 3, the ink warming block 200 includes a warming flow path 220 for circulating the ink therein. The warming flow path 220 connects the inflow port 222 and the connection port 230. The ink warming block 200 has a connection end face 232 continuing from the connection port 230. The ink warming block 200 has a hole 234 for attaching a sealing member 260 to the connection end face 232. The ink warming block 200 includes a sheet heater 240 on a side surface. In the ink warming block 200, a fixing portion 250 is fastened and fixed to the carriage 5 with a screw.

According to FIG. 3, the warming flow path 220 internally provided in the ink warming block 200 is formed by a first warming path 224 that lies from the inflow port 222 along the Z-direction, a second warming path 226 that continuously lies from the first warming path 224 along the X+ direction, and a third warming path 228 that continuously lies from the second warming path 226 along the Z− direction and reaches the connection port 230. The ink warming block 200 having the warming flow path 220 is heated by the sheet heater 240 described later. That is, the ink circulating through the warming flow path 220 is heated by the warming flow path 220, whereby the viscosity is lowered and the fluidity is improved.

In the following description, the warming flow path 220 refers to the third warming path 228 unless otherwise specified. The flow path diameter dimension of the warming flow path 220 is represented as $d_1$. The flow path diameter dimension $d_1$ of the warming flow path 220 is, for example, φ 2.2 mm. The ink warming block 200 may have a plurality of warming flow paths 220, and may be configured such that the ink is supplied from the plurality of ink storages 7 to the respective warming flow paths 220 via the pressure controller 100.

In the present example, a description will be made for a case where the flow path cross-sectional shape of the warming flow path 220 is a circular shape having the flow path diameter dimension $d_1$, and the flow path cross-sectional shape of the protruding flow path 312 is a circular shape having the flow path diameter dimension $d_2$. However, the flow path cross-sectional shapes of the warming flow path 220 and the protruding flow path 312 are not limited to circular shapes. That is, when the flow path cross-sectional shapes of the warming flow path 220 and the protruding flow path 312 are other than the circular shape, the respective flow path cross-sectional shapes can be made to correspond to the circular shape having the flow path diameter dimension $d_1$ and the flow path diameter dimension $d_2$, and can be applied to the present example. Here, the diameter dimension for a case where the flow path cross-sectional shape is made to correspond to a circular shape is calculated, for example, on the assumption that the area of the circular shape to be corresponded and the area of the flow path cross-sectional shape are equivalent.

The material of the ink warming block 200 is made of a material that easily transfers heat, and is, for example, an aluminum alloy. For example, after the entire shape of the ink warming block 200 is molded with a mold, the inflow port 222, the warming flow path 220, the connection port 230, the hole 234, the connection end face 232, and the like are provided by cutting. Unnecessary holes and the like generated by cutting are appropriately sealed.

The sheet heater 240 heats the ink warming block 200. The sheet heater 240 has flexibility and is mainly disposed on a side surface of the ink warming block 200. Specifically, according to FIG. 3, the sheet heater 240 is disposed to include and cover the side surface in the Y+ direction of the ink warming block 200 so as to lie along the second warming path 226 from the end face in the X− direction to the end face in the X+ direction of the ink warming block 200.

The sheet heater 240 is, for example, configured by covering heating wires with silicon rubber from both surfaces. The sheet heater 240 includes a temperature sensor. The sheet heater 240 can adjust the temperature by adjusting the supply voltage. The temperature sensor may be provided in the ink warming block 200. A power output of the sheet heater 240 is, for example, 36 W. The set temperature of the sheet heater 240 is, for example, 48° C.

<Sealing Member>

As illustrated in FIG. 3, the sealing member 260 seals and connects the ink warming block 200 and the protrusion 310. The sealing member 260 is, for example, a ring shaped seal ring. The seal ring (sealing member) 260 is attached to the hole 234 of the ink warming block 200. The outer diameter dimension of the seal ring 260 corresponds to the inner diameter dimension of the hole 234. The inner diameter dimension of the seal ring 260 corresponds to the outer diameter dimension of the protrusion 310.

When the conducting portion 210 is fixed to the ink warming block 200, the seal ring 260 attached to the hole 234 is pressed and deformed by the end face 216, and the position thereof is restricted with respect to the hole 234. When the head 300 is attached to the carriage 5, the distal end of the protrusion 310 penetrates the inner periphery of the seal ring 260 and is connected to the connection port 230. At this time, the protrusion 310 presses the surface of the inner periphery of the seal ring 260 with the surface of the outer periphery of the protrusion 310. The seal ring 260 deformed by the protrusion 310 closes a gap between the surface of the outer periphery of the distal end portion of the protrusion 310 and the hole 234. In this manner, the protruding flow path 312 is connected to the warming flow path 220.

<Ink Flow Path Portion>

As shown in FIG. 2, the ink flow path portion 6 includes the ink storage 7, the storage connector 9, the hose 10, the pressure controller 100, and the ink warming block 200.

<Protrusion>

As illustrated in FIG. 3, the protrusion 310 is provided to protrude from a head 300 described later. The protrusion 310 has a protruding flow path 312 for circulating the ink to the head 300 therein. As illustrated in FIG. 3, the protruding flow path 312 is connected to the warming flow path 220. The protrusion 310 causes ink to circulate from the ink flow path portion 6 to the head 300.

The protrusion 310 has a tubular shape and has an outer peripheral surface and an inner peripheral surface. The flow path formed by the inner peripheral surface of the protrusion 310 is the protruding flow path 312. The inner diameter dimension of the inner peripheral surface of the protruding flow path 312 is $d_2$. The protrusion 310 is made of resin, and is manufactured by, for example, injection molding. The flow path cross-sectional area of the protruding flow path 312 is configured to be smaller than the flow path cross-sectional area of the warming flow path 220. In the present example, a case where the protruding flow path 312 has a circular shape having the flow path diameter dimension $d_2$ will be described, but the protruding flow path 312 is not limited to a circular shape.

<Inkjet Head>

The head 300 ejects the ink fed from the protrusion 310 onto the print medium 3. As illustrated in FIG. 3, the head 300 internally includes a built-in heater 320, a nozzle 330, an ink chamber 340, a substrate 350, a heat insulating material 352, a radiator 354, a fan 356, and a head cover 360. The head 300 is disposed on the bottom surface of the carriage 5 so as to face the platen 4.

The nozzle 330 is provided on a surface of the head 300 facing the platen 4, and ejects ink. The nozzle 330 includes a plurality of arranged ejection holes (not illustrated), a piezoelectric element (not illustrated) that ejects ink from the ejection holes, a substrate 350 that controls the piezoelectric element, and a heat insulating material 352. The heat insulating material 352 is disposed between the built-in heater 320 and the substrate 350. The ejection of ink from the ejection hole of the nozzle 330 is controlled by the substrate 350 that controls the piezoelectric element. The substrate 350 includes a radiator 354 and a fan 356 on a surface opposite to a surface in contact with heat insulating material 352. The built-in heater 320 is configured similarly to the sheet heater 240. The set temperature of the built-in heater 320 is, for example, 45° C.

The ink chamber 340 supplies the ink from the protrusion 310 to the entire surface of the nozzle 330. The ink chamber 340 is provided between the nozzle 330 and the built-in heater 320, and faces the surface of the nozzle 330. That is, the surface of the ink chamber 340 in the Z+ direction is in contact with the built-in heater 320, and the surface of the ink chamber 340 in the Z− direction is in contact with the nozzle 330. In the ink chamber 340, the ink warmed by the built-in heater 320 is supplied to the nozzle 330. The ink in the head 300 is heated by the built-in heater 320 to maintain a high fluidity state.

<Conducting Portion>

The conducting portion 210 heats the protrusion 310. The conducting portion 210 is formed integrally with the ink warming block 200 so as to easily transfer heat from the ink warming block 200. The conducting portion 210 of the present example is a member separate from the ink warming block 200. As illustrated in FIG. 3, the conducting portion 210 is disposed on the connection end face 232 of the ink warming block 200. The material of the conducting portion 210 is made of a material that easily conducts heat, and is, for example, an aluminum alloy. The material of the conducting portion 210 may be made of the same material as the ink warming block 200.

As illustrated in FIG. 3, the conducting portion 210 has a cylindrical shape, and has an outer periphery 212 and an inner periphery 214 of the conducting portion 210. The diameter dimension of the inner periphery 214 of the conducting portion 210 is the dimension corresponding to the outer diameter dimension of the protrusion 310 to be described later. The conducting portion 210 can adjacently surround the periphery of the protrusion 310.

The end face 216 of the conducting portion 210 is precisely polished. The conducting portion 210 has an attachment hole (not illustrated), and is fastened and fixed to the ink warming block 200 from the lower side (Z-direction side) of the attachment hole with a screw. The conducting portion 210 may have a positioning structure with respect to the ink warming block 200. The conducting portion 210 may have, for example, an inlay structure. Thus, the conducting portion 210 can be easily and conveniently positioned with respect to the ink warming block 200.

Furthermore, in the present example, the case where the conducting portion 210 is a member separate from the ink warming block 200 has been described, but the configuration of the conducting portion 210 is not limited thereto. That is, the conducting portion 210 may be a part of the member of the ink warming block 200. In this case as well, the conducting portion 210, which is a part of the member of the ink warming block 200, is arranged adjacent to the protrusion 310. Furthermore, in this case, the conducting portion 210 may be disposed so as to adjacently surround the periphery of the protrusion 310.

In the present example, the case where the conducting portion 210 has a cylindrical shape has been described, but the shape of the conducting portion 210 is not limited thereto. The conducting portion 210 may be disposed adjacent to the protrusion 310. Here, "disposed adjacent to" means that the protrusion 310 is disposed adjacent to the conducting portion 210, and a distance between the protrusion 310 and the conducting portion 210 is close to an extent that heat can be transferred between the protrusion 310 and the conducting portion 210, and includes a contact state. The conducting portion 210 may be configured by a plurality of structural bodies.

According to FIG. 3, the conducting portion 210 is disposed adjacent to the protrusion 310 between the ink warming block 200 and the carriage 5, but the position where the conducting portion 210 is disposed is not limited thereto. The conducting portion 210 may be disposed adjacent to the protrusion 310 between the ink warming block 200 and the head 300. Thus, the conducting portion 210 can heat the protrusion 310 at a longer distance. In this case, the carriage 5 has a hole having a diameter larger than the diameter of the outer periphery 212 of the conducting portion 210 through which the conducting portion 210 is disposed.

The head unit 2 is mounted on the carriage 5. The carriage 5 may include a plurality of head units 2. The carriage 5 is guided by the guide rail 12 over the entire width in the Y direction of the print medium 3 by the carriage driver 11, and moves in the Y+ direction or the Y− direction. The carriage 5 includes a controller (not illustrated) for controlling the sheet heater 240, the built-in heater 320, and the like to be described later, and a UV irradiator (not illustrated) for curing the ejected UV ink.

The carriage driver 11 moves the carriage 5 in the Y+ direction or the Y− direction, as described above. The carriage driver 11 can adjust the moving speed of the carriage 5 and stop the carriage 5 with high stop position accuracy. The carriage driver 11 includes, for example, a belt and pulley mechanism (not illustrated) and a motor.

The print medium 3 is placed on the platen 4. The platen 4 includes a feed roller 8 for feeding the print medium 3 in the feeding direction (X+ direction). The platen 4 performs a so-called intermittent operation of feeding the print medium 3 by a certain length in the feeding direction (X+ direction) in correspondence with the printing operation.

The print medium 3 is placed on the platen 4, as illustrated in FIG. 2. The print medium 3 is set in the printer 1 in a state of being wound in a roll form, and is drawn out in correspondence with a printing operation and placed on the platen 4. The material of the print medium 3 is, for example, paper, fabric, resin film, or the like. The print medium 3 may be configured to be set in a state of a unit with respect to the printer 1 and supplied in correspondence with the printing operation.

<Heat Transfer>

Hereinafter, a mechanism in which the heat from the ink warming block 200 heats the ink via the conducting portion 210 and the protrusion 310 will be described. First, the heat from the ink warming block 200 heated by the sheet heater 240 is transferred to the conducting portion 210 through a contact portion between the connection end face 232 and the end face 216 of the conducting portion 210. The heat transferred from the ink warming block 200 to the end face 216 spreads into the conducting portion 210 by heat conduction, whereby the temperature of the conducting portion 210 rises.

The heat is transferred to the protrusion 310 by the conducting portion 210 disposed adjacent to the protrusion. The transfer of heat from the conducting portion 210 to the protrusion 310 is mainly performed by heat conduction through a contact portion between the inner periphery 214 of the conducting portion 210 and the outside of the protrusion 310. When the inner periphery 214 of the conducting portion 210 and the outside of the protrusion 310 do not come into contact with each other, heat transfer from the conducting portion 210 to the protrusion 310 is mainly performed by heat transfer or heat radiation from the inner periphery 214 of the conducting portion 210 to the outside of the protrusion 310.

In the heat transfer from the protrusion 310 to the ink circulating through the protruding flow path 312, first, the heat transferred from the conducting portion 210 to the protrusion 310 is heat conducted in the protrusion 310, so that the temperature of the protrusion 310 rises. Thereafter, heat is transferred from the wall surface of the protruding flow path 312 whose temperature has raised to the ink circulating through the protruding flow path 312. The heat transfer from the wall surface of the protruding flow path 312 to the ink circulating through the protruding flow path 312 is carried out by heat conduction. In this manner, the heat of the ink warming block 200 is transferred to the protruding flow path 312 through the conducting portion 210 and the protrusion 310 to heat the ink circulating through the protruding flow path 312.

<Regarding Flow Path Cross-Sectional Area>

Figure 4:
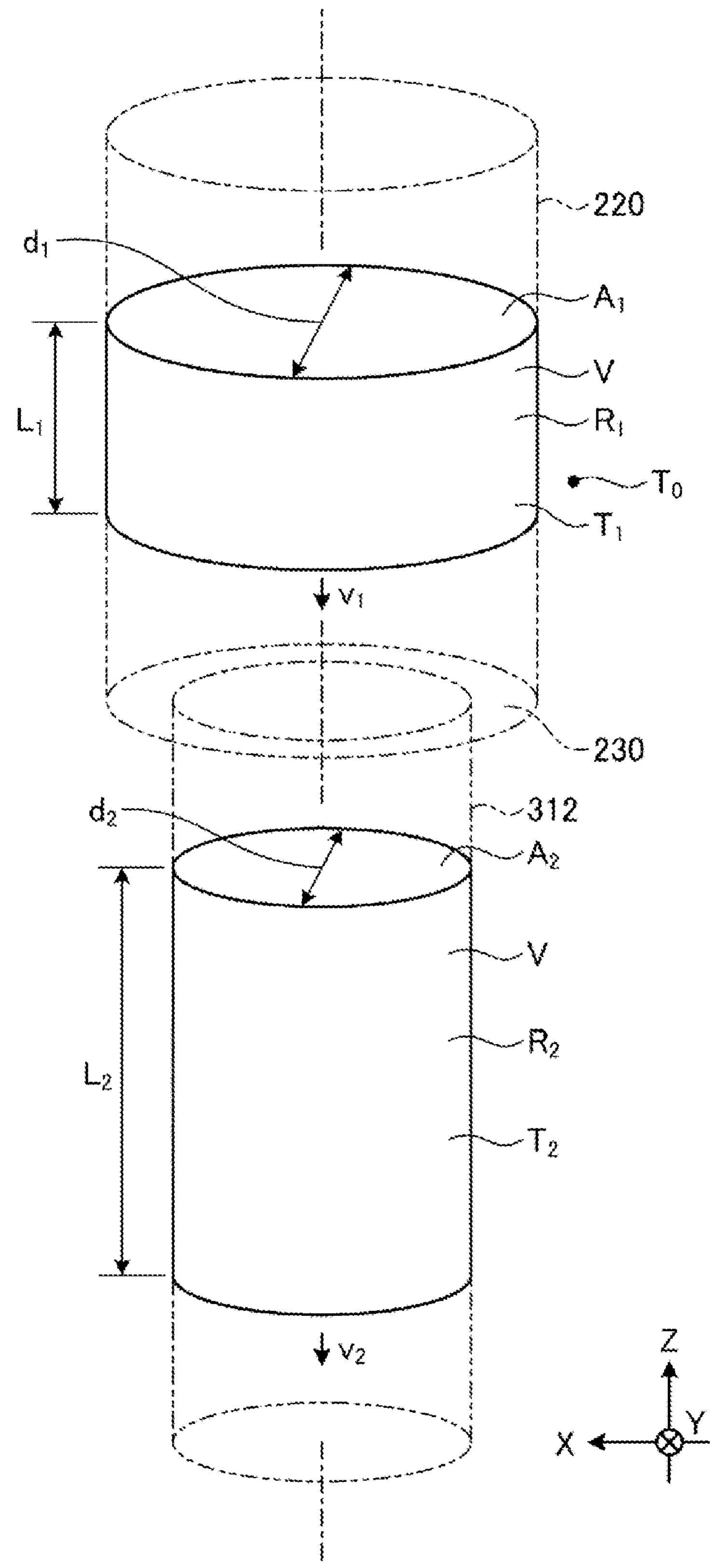
FIG. 4 is a conceptual view illustrating a heat transfer area of ink in a warming flow path and a protruding flow path according to the present example.

Hereinafter, the relationship between the protruding flow path 312 and the warming flow path 220 will be described with reference to FIG. 4. Here, the density of the ink in the flow path from the ink flow path portion 6 to the head 300 can be regarded as constant. Furthermore, the flow rate of the ink in the flow path from the ink flow path portion 6 to the head 300 is constant. Therefore, in the flow path having a small flow path cross-sectional area, the flow velocity of the flowing ink becomes faster than in the flow path having a large flow path cross-sectional area. In this case, as shown in FIG. 4, when the flow velocity of the ink flow in the warming flow path 220 is $v_1$ and the flow velocity of the ink flow in the protruding flow path 312 is $v_2$, the following equation (1) is given.

$$v_2/v_1=A_1/A_2 \quad \text{Equation (1)}$$

The flow path cross-sectional area will be specifically described with reference to FIG. 3. As illustrated in FIGS. 3 and 4, the flow path diameter dimension $d_2$ of the protruding flow path 312 is smaller than the flow path diameter dimension $d_1$ of the warming flow path 220. That is, the flow path cross-sectional area $A_2$ of the protruding flow path 312 is smaller than the flow path cross-sectional area $A_1$ of the warming flow path 220. In the warming flow path 220, when the flow path diameter dimension $d_1$ is φ 2.2 mm, the flow path cross-sectional area $A_1$ of the warming flow path 220 becomes about 3.8 mm$^2$. In the protruding flow path 312, when the flow path diameter dimension $d_2$ is φ 1.6 mm, the flow path cross-sectional area $A_2$ becomes about 2 mm$^2$.

In this case, when the flow path cross-sectional area $A_1$ of the warming flow path 220 and the flow path cross-sectional area $A_2$ of the protruding flow path 312 are substituted into Equation (1) to obtain the flow velocity $v_2$ of the ink in the protruding flow path 312, the flow velocity $v_2$ is about 1.9 times the flow velocity $v_1$ of the ink flow in the warming flow path 220. In this manner, the fluidity can be increased in the protruding flow path 312 than in the warming flow path 220 by making the flow path cross-sectional area $A_2$ of the protruding flow path 312 smaller than the flow path cross-sectional area $A_1$ of the warming flow path 220.

From another point of view, when the flow path cross-sectional area $A_2$ of the protruding flow path 312 is made smaller than the flow path cross-sectional area $A_1$ of the warming flow path 220, the time during which the ink stays in the protruding flow path 312 becomes shorter than the time during which the ink stays in the warming flow path 220. Therefore, the time during which the heat energy is transferred between the protrusion 310 and the ink circulating through the protruding flow path 312 is shorter than the time during which the heat energy is transferred between the warming flow path 220 and the ink flowing through the warming flow path 220.

This case will be specifically described. When the temperature $T_2$ of the ink flowing through the protruding flow path 312 is higher than the temperature $T_0$ of the warming flow path 220 and the protruding flow path 312, the heat energy of the ink flowing through the protruding flow path 312 is transferred to the protrusion 310. In the present example, the flow path diameter dimension $d_2$ of the protruding flow path 312 is smaller than the flow path diameter dimension $d_1$ of the warming flow path 220. Therefore, the flow velocity $v_2$ of the ink flowing through the protruding flow path 312 is faster than the flow velocity $v_1$ of the ink flowing through the warming flow path 220. As a result, the time during which the ink stays in the protruding flow path 312 is shortened, and the amount of heat energy released from the ink passing through the protruding flow path 312 is suppressed. The increase in ink viscosity is suppressed by reducing the decrease in the ink temperature in the protruding flow path 312, and the fluidity of the ink is maintained.

When the temperature $T_2$ of the ink flowing through the protruding flow path 312 is lower than the temperature $T_0$ of the protruding flow path 312, the ink circulating through the protruding flow path 312 receives the heat energy from the protruding flow path 312. Thus, the viscosity of the ink in the protrusion 310 can be lowered, and the fluidity can be improved.

In addition, when a heat transfer area in which the ink per unit volume V in the warming flow path 220 receives heat energy from the wall surface of the warming flow path 220 is $R_1$, and a heat transfer area in which the ink per unit volume V in the protruding flow path 312 receives heat energy from the wall surface of the protruding flow path 312 is $R_2$, Equation (2) is obtained. Here, when the height (length in the Z direction) of the ink per unit volume V in the warming flow path 220 is $L_1$ and the height (length in the Z direction) of the ink per unit volume V in the protruding flow path 312 is $L_2$, the heat transfer area $R_1$ is $\pi d_1 L_1$ and the heat transfer area $R_2$ is $\pi d_2 L_2$.

$$R_2=(d_1/d_2)\cdot R_1 \quad \text{Equation (2)}$$

In other words, the heat transfer area $R_2$ in which the ink per unit volume V in the protruding flow path 312 receives heat energy from the wall surface of the protruding flow path 312 becomes larger than the heat transfer area $R_1$ in which the ink receives heat energy from the wall surface of the warming flow path 220. Thus, the ink is more efficiently heated by the warming flow path 220 in the protruding flow path 312.

Here, since the flow path diameter dimension $d_2$ of the protruding flow path 312 is configured to be smaller than the flow path diameter dimension $d_1$ of the warming flow path 220, the temperature $T_0$ of the protruding flow path 312 is higher than the temperature $T_2$ of the ink flowing through the protrusion 310 in the protrusion 310 disposed adjacent to the conducting portion 210 to where the heat is transferred from the ink warming block 200. Therefore, the ink can be efficiently heated in the protruding flow path 312.

<Shape of Protruding Flow Path>

Next, the shape of the protruding flow path 312 will be described. In FIG. 3, the shape of the protruding flow path 312 is represented by the same flow path diameter dimension $d_2$ over the entire length of the protrusion 310, but this is not the sole case. The flow path diameter dimension of the protrusion 310 merely needs to be smaller than the flow path diameter dimension $d_1$ of the warming flow path 220 in at least a part of the entire length of the protrusion 310. As a result, the flow velocity of the ink flowing through the protruding flow path 312 becomes faster than the flow velocity of the ink in the warming flow path 220, and hence the fluidity of the ink can be improved.

Figure 5:
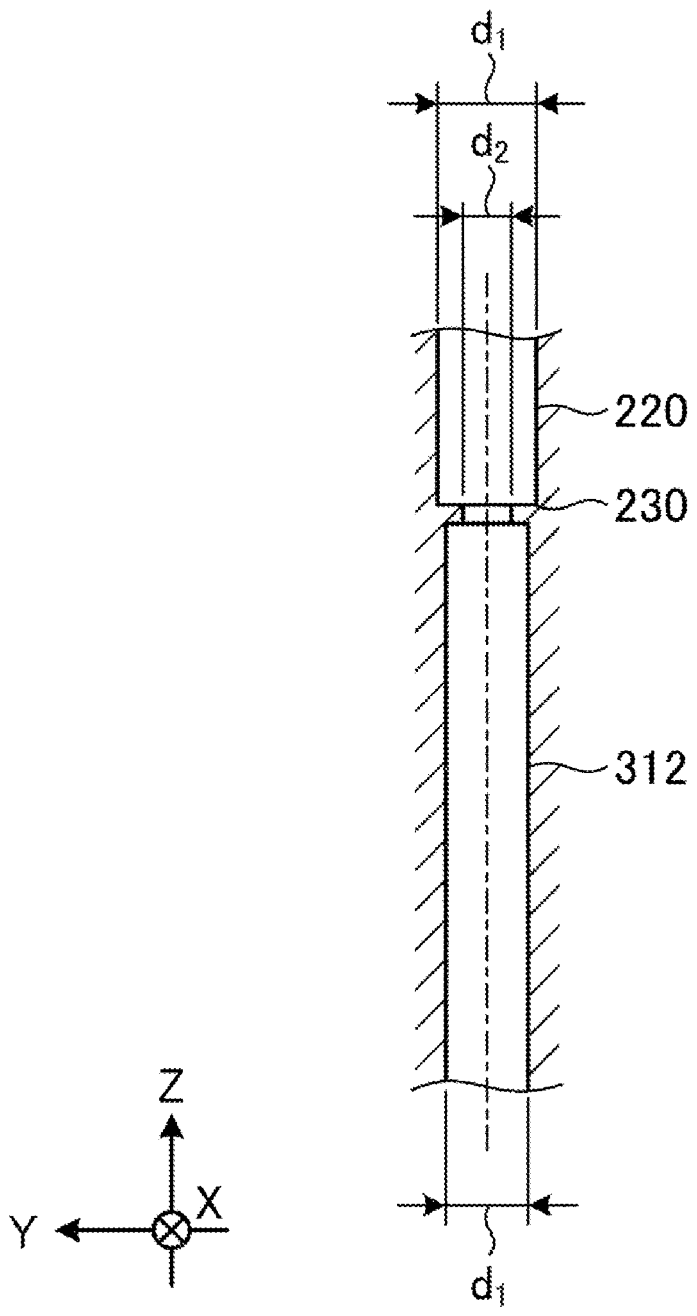
FIG. 5 is a cross-sectional view illustrating a shape of a protruding flow path according to a modified example of the present example.

Furthermore, as shown in FIG. 5, for example, the shape of the protruding flow path 312 of the protrusion 310 may include a portion having a flow path diameter dimension $d_2$ in an orifice form at a portion facing the connection end face 232 of the protrusion 310, and the other portion may be configured to have the same flow path diameter dimension as the flow path diameter dimension $d_1$ of the warming flow path 220. In addition, the protrusion 310 has the flow path diameter dimension $d_2$ in the surface of the protrusion 310 in contact with the connection end face 232, and may change, for example, by uniformly expanding from the flow path diameter dimension $d_2$ to the same diameter dimension as the flow path diameter dimension $d_1$ of the warming flow path 220 in the entire length. Furthermore, the flow path diameter dimension of the protrusion 310 is $d_2$ in the surface of the protrusion 310 in contact with the connection end face 232, and may change, for example, by expanding in a stepwise manner from the flow path diameter dimension $d_2$ to the same dimension as the flow path diameter dimension $d_1$ of the warming flow path 220 in the entire length.

Other Embodiments

<Assembly Method>

A method for assembling the head unit 2 of the printer 1 according to the present invention will be described. The head 300 is assembled to the ink warming block 200 attached to the carriage 5. That is, the sealing member 260 is arranged in the hole 234 of the ink warming block 200, and the sealing member 260 is positioned by fixing the conducting portion 210 to the ink warming block 200. Thereafter, the protrusion 310 of the head 300 is attached from below. The protrusion 310 penetrates an opening provided in the carriage 5 and an inner periphery of the conducting portion 210, and is connected to the connection port 230 of the ink warming block 200. Here, the seal surface at the distal end of the protrusion 310 is sealed by pressing the inner periphery of the sealing member 260. Thereafter, the head 300 is fixed to the carriage 5.

<Protrusion Including Sealing Member>

The sealing member 260 may be attached to the distal end portion of the protrusion 310 instead of the ink warming block 200. In this case, the conducting portion 210 is configured separately from the ink warming block 200. The sealing member 260 is attached to a distal end portion of the protrusion 310 where the conducting portion 210 is adjacently arranged in advance. That is, the conducting portion 210 is located between the sealing member 260 and the head 300 with respect to the protrusion 310. Thereafter, the protrusion 310 including the conducting portion 210 and the sealing member 260 is attached to the ink warming block 200.

An embodiment according to the present invention will be described in detail below based on the drawings. It should be noted that the present invention is not to be limited by the embodiment. Furthermore, the constituent elements in the following embodiment include those that can be easily replaced by those skilled in the art, or those that are substantially the same. Moreover, the constituent elements described below can be appropriately combined, and when there are a plurality of embodiments, it is also possible to combine the respective embodiments.

Present Embodiment

An inkjet printer 91 (hereinafter also simply referred to as printer 91) according to the present embodiment is a device that prints an image on a medium 92 serving as a recording medium through an inkjet method. As the medium 92, for example, an impermeable medium that uses metal, resin, and the like which is impermeable to ink, and a permeable medium that uses fabric, paper and the like which is permeable to ink can be applied, and any material can be applied as long as it is a medium 92 on which an image can be formed. Furthermore, as the ink, for example, an ultraviolet-curable ink (UV ink) that cures by irradiation of ultraviolet light may be used. The UV ink of the present embodiment is an ink having a high viscosity in a temperature range of normal temperature (e.g., 15° C. to 25° C.). Next, the printer 91 will be described with reference to FIGS. 6 to 10.

Figure 6:
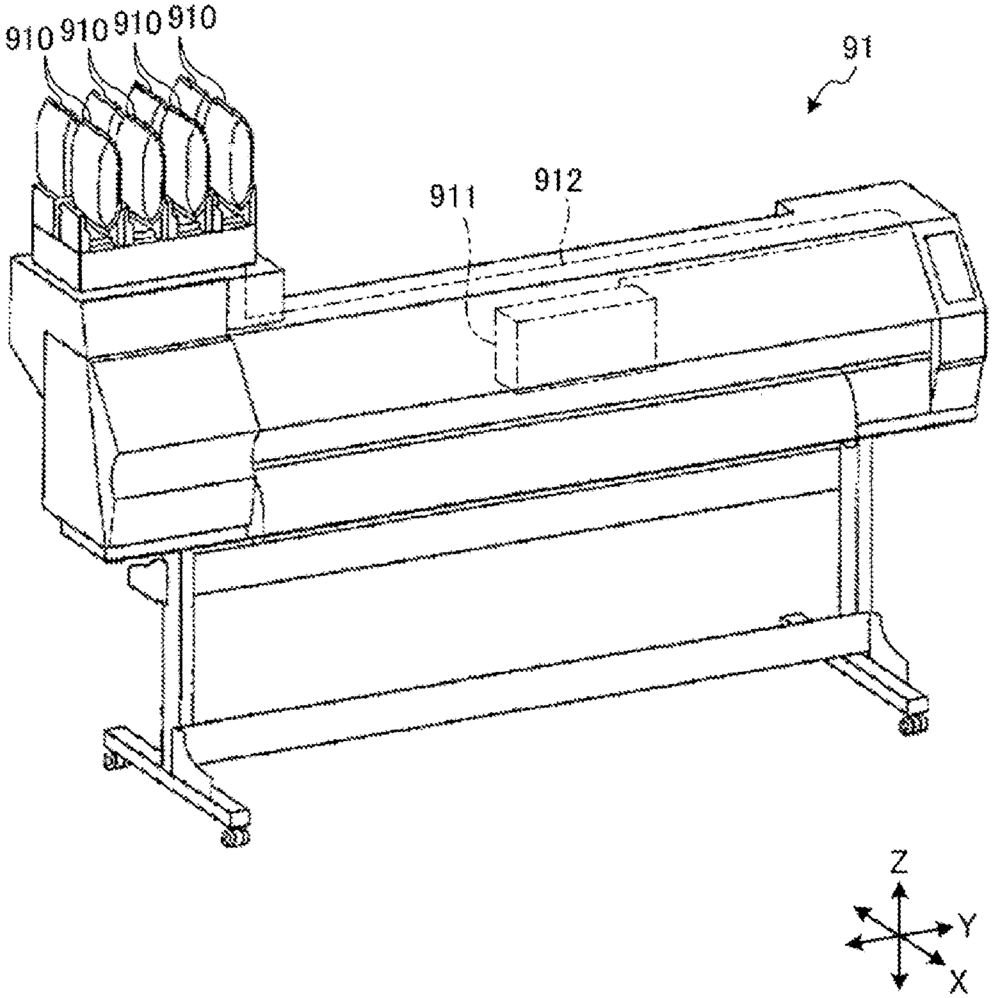
FIG. 6 is a perspective view of an inkjet printer according to the present embodiment.
Figure 7:
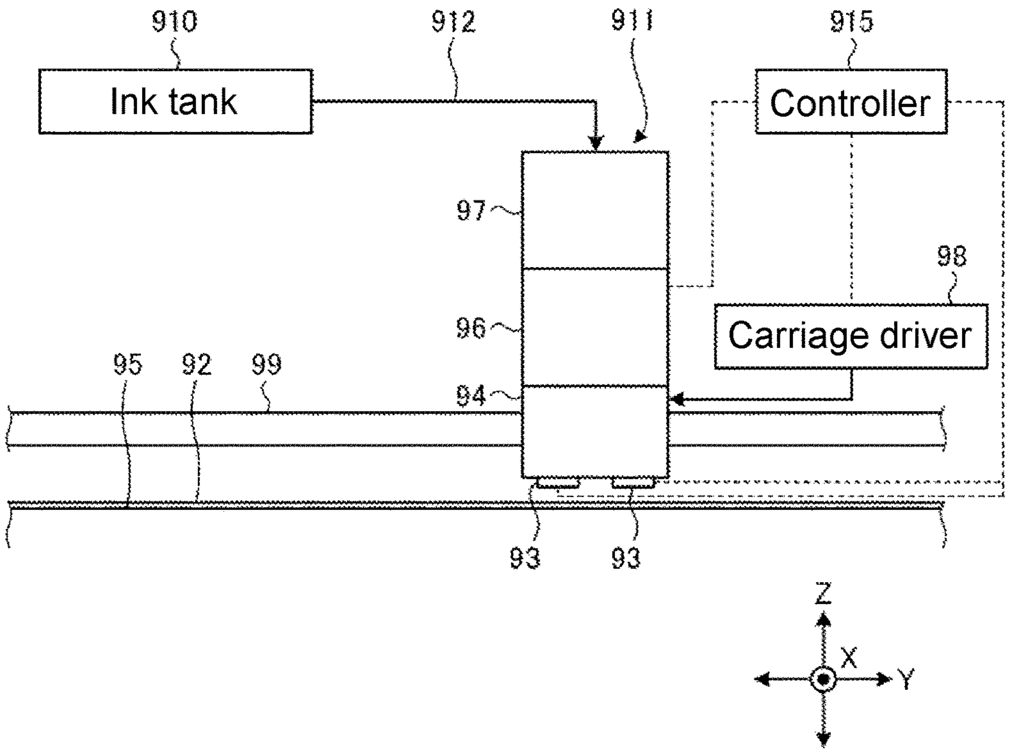
FIG. 7 is a schematic view schematically showing a configuration around an inkjet head.
Figure 8:
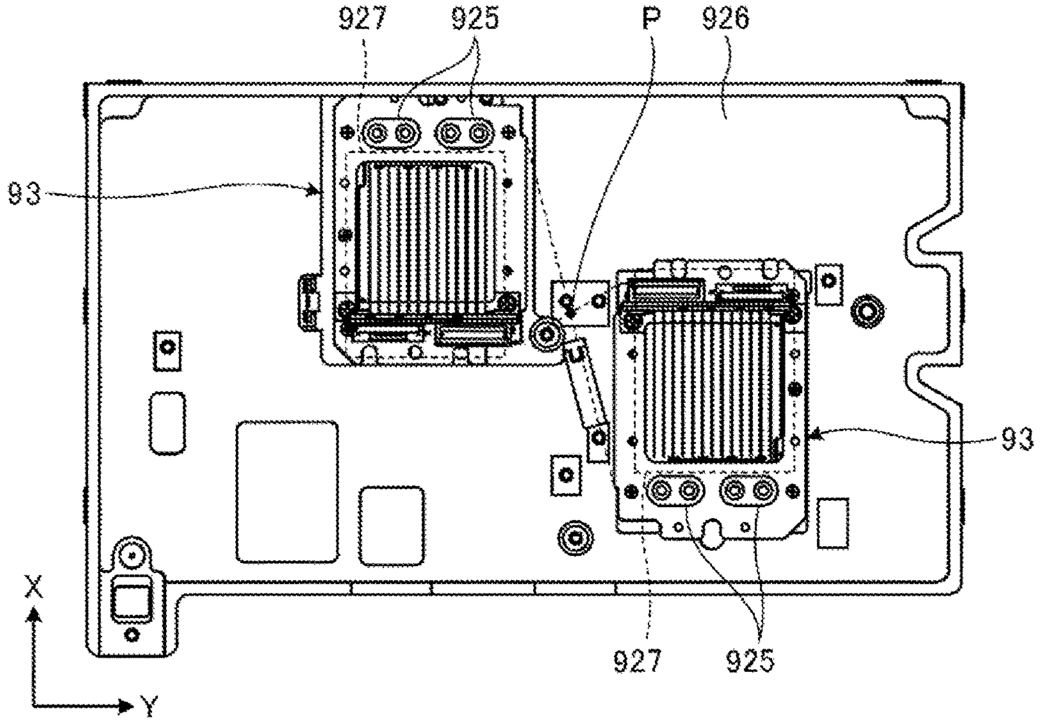
FIG. 8 is a plan view showing an inflow port side of the inkjet head.
Figure 9:
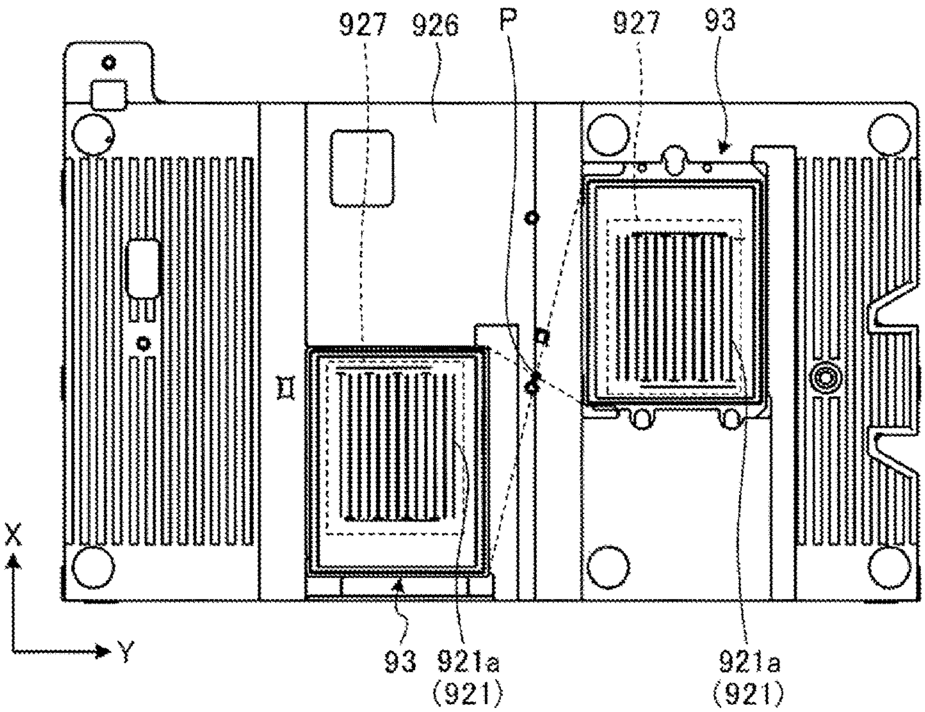
FIG. 9 is a plan view showing a nozzle surface side of the inkjet head.
Figure 10:
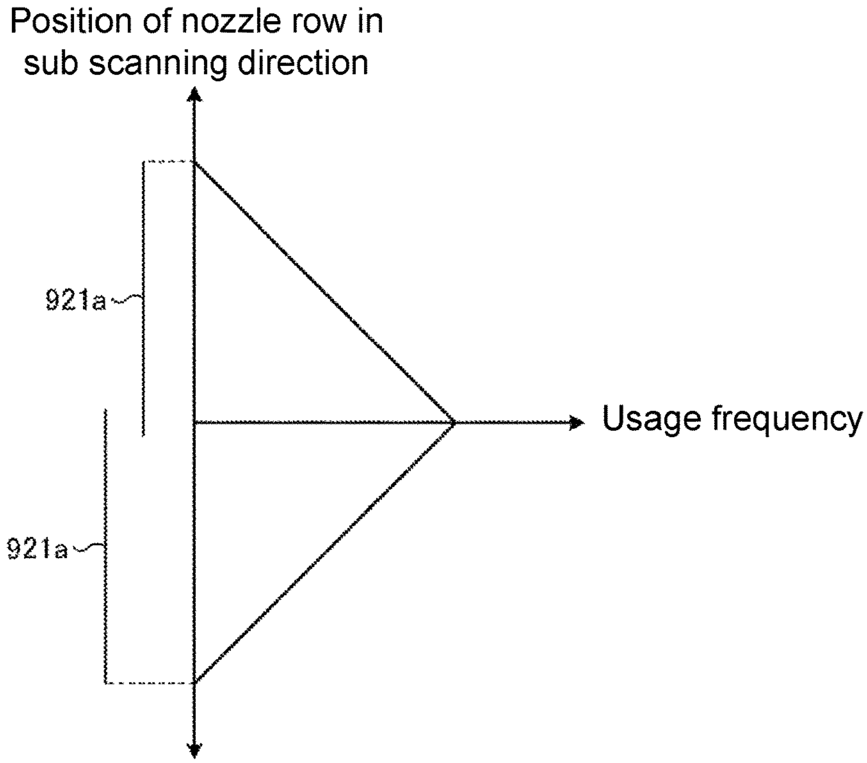
FIG. 10 is an explanatory view illustrating an ejection frequency of ink in a nozzle row.

FIG. 6 is a perspective view of an inkjet printer according to the present embodiment. FIG. 7 is a schematic view schematically showing a configuration around an inkjet head. FIG. 8 is a plan view showing an inflow port side of the inkjet head. FIG. 9 is a plan view showing a nozzle surface side of the inkjet head. FIG. 10 is an explanatory view illustrating an ejection frequency of ink in a nozzle row.

As shown in FIGS. 6 and 7, the printer 91 includes an inkjet head 93 (hereinafter also simply referred to as the head 93), a carriage 94, a platen 95, a warming block 96, a pressure adjuster 97, a carriage driver 98, a guide rail 99, an ink tank 910, and a controller 915. In FIGS. 6 and 7, the X direction is a direction in which the medium 92 is conveyed, and is a sub scanning direction. The Y direction is a direction in which the inkjet head 93 is moved, and is the main scanning direction. The Z direction is a direction orthogonal to the main scanning direction and the sub scanning direction, and is, for example, a vertical direction when a plane including the main scanning direction and the sub scanning direction is a horizontal plane.

The head 93 is provided on the carriage 94, and ejects the UV ink toward the medium 92. The head 93 has a nozzle row 921*a* including a plurality of nozzles 921 arranged in the X direction (sub scanning direction). Furthermore, a plurality of nozzle rows 921*a* are provided according to the type of color to use in the head 93, and for example, the nozzle rows 921*a* for four colors of C, M, Y, and K are arranged side by side in the Y direction. Two (a pair of) heads 93 are provided on the carriage 94. The two nozzle rows 921*a* of the two heads 93 are formed as long nozzle rows 921*a* continuous in the X direction by aligning the end portions in the X direction when viewed from the Y direction (main scanning direction).

The platen 95 is provided to face the head 93 in the Z direction. The medium 92 is placed on the platen 95. The platen 95 heats the medium 92 placed thereon and heats the ink ejected on the medium 92 through the medium 92 to promote drying of the ink.

The carriage 94 includes a warming block 96 and a pressure adjuster 97 in addition to the head 93. The carriage driver 98 moves the carriage 94 along the guide rail 99. The guide rail 99 is provided to extend in the Y direction, and the carriage driver 98 moves the carriage 94 along the Y direction. At this time, the carriage 94 moved by the carriage driver 98 integrally moves the head 93, the warming block 96, and the pressure adjuster 97. The head 93, the warming block 96, and the pressure adjuster 97 are integrally configured as a head unit 911.

The warming block 96 is provided on the upstream side of the head 93 in the circulating direction of the ink. The warming block 96 heats and warms the UV ink supplied to the head 93 to lower the viscosity of the ink supplied to the head 93.

Ink is supplied to the pressure adjuster 97 from the ink tank 910 through the ink supply line 912. The ink tank 910 is disposed above the pressure adjuster 97, and ink is supplied to the pressure adjuster 97 by a water head difference. The pressure adjuster 97 adjusts the pressure of the ink supplied to the warming block 96. The pressure adjuster 97 is, for example, a mechanical pressure damper configured similarly to the pressurization damper disclosed in Japanese Unexamined Patent Publication No. 2012-232595. Specifically, the pressure adjuster 97 adjusts the pressure of the ink so that the ink chamber formed inside the head 93 has a negative pressure.

The controller 915 is connected to the head 93, the warming block 96, and the carriage driver 98. The controller 915 includes, for example, an integrated circuit such as a central processing unit (CPU). The controller 915 performs ink ejection control by the head 93, performs ink warming control by the warming block 96, and performs movement control of the head 93 in the main scanning direction by the carriage driver 98.

In the inkjet printer 91 described above, the ink first flows out from the ink tank 910 to the ink supply line 12, and flows into the pressure adjuster 97 through the ink supply line 12. The ink whose pressure has been adjusted by the pressure adjuster 97 is supplied to the warming block 96. The ink is warmed in the warming block 96 to lower the viscosity, and then supplied toward the head 93. Then, the head 93 ejects the ink toward the medium 92 while moving in the Y direction.

Next, the periphery of the inkjet head 93 will be described with reference to FIGS. 8 and 9. As described above, two inkjet heads 93 are mounted on the carriage 94, and attached to the base plate 926. As shown in FIGS. 8 and 9, the two heads 93 are arranged side by side with a predetermined gap in the main scanning direction with respect to the base plate 926. Furthermore, the two heads 93 are arranged at different positions in the sub scanning direction such that the two nozzle rows 921*a* are arranged in the sub scanning direction when viewed from the main scanning direction. The end portions of the two nozzle rows 921*a* arranged in the sub scanning direction overlap each other when viewed from the main scanning direction.

Each head 93 includes a nozzle row 921*a* consisting of a plurality of nozzles 921, an ink supply port 925, and an ink warming heater 927. The ink warmed by the warming block 96 flows into the ink supply port 925. The ink supply port 925 is provided on one side in the sub scanning direction with respect to the nozzle row 921*a*. A plurality of ink supply ports 925 are provided according to the type of color to use, and for example, the ink supply ports 925 for four colors of C, M, Y, and K are arranged side by side in the Y direction.

The ink warming heater 927 warms the ink inside the head 93. The ink warming heater 927 warms the ink circulating inside the head 93 to lower the viscosity of the ink.

Here, since the ink supply port 925 is provided on one side in the sub scanning direction with respect to the nozzle row 921*a*, in the nozzle row 921*a*, one side in the sub scanning direction become a side closer to the ink supply port 925, and the other side in the sub scanning direction becomes a side farther from the ink supply port 925. That is, the nozzle 921 on the side closer to the ink supply port 925 has a short flow path length from the ink supply port 925, and the nozzle 921 on the side farther from the ink supply port 925 has a long flow path length from the ink supply port 925. In the case of such head 93, since the nozzle 921 on the side closer to the ink supply port 925 has a short flow path length, the warming of ink becomes insufficient immediately after the ejection of ink, and the ejection speed of the ink varies as compared with the nozzle 921 on the side farther from the ink supply port 925.

As shown in FIG. 8, the two heads 93 are arranged side by side with a predetermined interval in the main scanning direction. Furthermore, the two heads 93 are arranged such that each of the ink supply ports 925 is located on the outer side in the sub scanning direction. That is, the ink supply port 925 of each head 93 are arranged so as to be located on both end sides in the sub scanning direction with respect to the two nozzle rows 921*a* continuous in the sub scanning direction. That is, the two heads 93 are arranged adjacent to each other in the sub scanning direction so that the end portions on the other side (side farther from the ink supply port 925) of the nozzle row 921*a* are proximate to each other. That is, when two heads 93 perform the printing operation on the medium 92 at the same time, the other end portions of the two heads 93 are proximate to each other so that the nozzle row 921*a* of each of the two heads 93 can be regarded as a continuous nozzle row. Therefore, among the two nozzle rows 921*a* arranged in the sub scanning direction, one nozzle row 921*a* becomes the nozzle 921 on the side of the other nozzle row 921*a*, and on the side farther from the ink supply port 925. Similarly, among the two nozzle rows 921*a* arranged in the sub scanning direction, the other nozzle row 921*a* becomes the nozzle 921 on the side of the one nozzle row 921*a*, and on the side farther from the ink supply port 925. In the two nozzle rows 921*a*, the nozzles 921 on the side farther from the ink supply port 925 are aligned in the sub scanning direction, and thus the nozzles 921 having a small variation in the ink ejection speed are aligned.

Furthermore, as illustrated in FIGS. 8 and 9, the two heads 93 have the same structure, and are arranged point-symmetrically with phases differed by 180 degrees about the symmetry point P in a plane including the X direction and the Y direction. That is, one head 93 is at a position rotated by 180 degrees about the symmetry point P with respect to the other head 93 in a plane including the X direction and the Y direction. For this reason, the nozzle rows 921*a* for the four colors of C, M, Y, and K in the two heads 93 are also arranged point-symmetrically with the phase differed by 180 degrees about the symmetry point P.

Next, ink ejection control by the controller 915 will be described with reference to FIG. 10. The controller 915 performs printing through a multi-pass method of performing a plurality of main scans for a plurality of print passes with respect to each position of the medium 92. The main scan is an operation of ejecting ink droplets onto the medium 92 while moving the head 93 in the main scanning direction.

Specifically, the printer 91 performs printing through, for example, a multi-pass method in which the pass number of printing is N (N is an integer of two or more). The pass number N of printing is, for example, four or more, preferably eight or more. Furthermore, in this case, the nozzles 921 in the nozzle row 921*a* of each head 93 are assigned according to the respective print pass of the first pass to the $N^{th}$ pass.

For example, when the print pass number is N, the nozzle row 921*a* is divided into N regions in which the plurality of nozzles 921 arranged in the sub scanning direction is the same in number. Then, the respective print passes of the first pass to $N^{th}$ passes are assigned to the nozzle row 921*a* divided into the N regions in order from the region that overlaps the medium 92 first in accordance with the conveyance of the medium 92 in the sub scan. Here, the sub scan is an operation of conveying the medium 92 in the sub scanning direction with respect to the head 93. Then, the controller 915 sets the movement amount in one sub scan to a pass width, which is the width (width in the sub scanning direction) of the arrangement of the nozzles 921 for one print pass. The pass width is a width in the sub scanning direction of each of the regions divided into N. The controller 915 causes the head 93 to perform the sub scan between the main scans by the head 93. As a result, every time each main scan is performed, the controller 915 shifts the region of the medium 92 facing the head 93 by the pass width in the sub scanning direction. In each main scan, the nozzles 921 in each region in the nozzle row 921*a* perform printing for the corresponding print pass.

Furthermore, in the control of printing corresponding to each print pass, the controller 915 selects the pixel to which the ink droplet is to be ejected. More specifically, for example, the controller 915 uses mask data, which is data designating a pixel to which an ink droplet is to be ejected, in each of a plurality of print passes performed for each position of the medium 92, and causes each head 93 to eject the ink droplet to the pixel designated by the mask data. As described above, the controller 915 performs printing through the multi-pass method using the mask data. That is, the controller 915 uses the mask data to control the ejection frequency of the ink ejected from the nozzle row 921*a* of the head 93 as the ejection control of the head 93 at the time of executing the main scan. The controller 915 controls the ejection frequency of the ink to suppress the occurrence of banding formed in the main scanning direction, and form an image having a smooth gradation. As such control of the ejection frequency of ink, Mimaki Advanced Pass System (MAPS) is known.

Here, when performing printing through the multi-pass method using the two heads 93, the mask data used for each of the plurality of print passes is, for example, a pattern shown in FIG. 10. The mask data shown in FIG. 10 is mask data of a pattern in which the nozzle usage frequency continuously changes in the sub scanning direction, in other words, a pattern in which the concentration of the ink ejected to the medium 92 continuously changes.

In the mask data shown in FIG. 10, the nozzle usage frequency (concentration) at the center in the sub scanning direction is set higher than the nozzle usage frequencies on both sides with respect to the entire length of the two nozzle rows 921*a* arranged in the sub scanning direction. In other words, in the mask data shown in FIG. 10, the nozzle usage frequency on the other end portion side (side farther from the ink supply port 925) proximate to each other of the nozzle rows 921*a* of the two heads 93 becomes high, and the nozzle usage frequency on one end portion side (side closer to the ink supply port 925) of the nozzle row 921*a* becomes low. The ejection frequency of the ink controlled using the mask data shown in FIG. 10 is a triangular pattern in which the nozzle usage frequency at the center in the sub scanning direction is set to the maximum (apex) and the nozzle usage frequency at both ends in the sub scanning direction is set to zero in the entire length of the nozzle row 921*a*, and the frequency decreases constantly from the center toward both sides in the sub scanning direction. The triangular pattern may have a trapezoidal shape. The pattern shape of the nozzle usage frequency may be any shape as long as the nozzle usage frequency at the center in the sub scanning direction is higher than the nozzle usage frequency on both sides in the sub scanning direction.

In the present embodiment, the ink ejection control is performed using the mask data described above, and hence the nozzle 921 having a high nozzle usage frequency becomes the nozzle on the side farther from the ink supply port 925, and the nozzle 921 having a low nozzle usage frequency becomes the nozzle 921 on the side closer to the ink supply port 925. Therefore, the nozzle 921 having a high nozzle usage frequency is the nozzle 921 having a small variation in the ink ejection speed, and the nozzle 921 having a low nozzle usage frequency is the nozzle 921 having a large variation in the ink ejection speed.

As described above, according to the present embodiment, the nozzles 921 on the side farther from the ink supply port 925 can be combined in the two nozzle rows 921*a* arranged in the sub scanning direction. That is, the nozzles 921 on the side where the variation in the ejection speed of the ink is small and the ejection stability of the ink is high may be combined so as to be continuous or overlap in the sub scanning direction. Therefore, streaks due to shading, that is, banding can be made less likely to occur, and the image quality of the medium 92 can be improved.

Furthermore, according to the present embodiment, since the ink to be supplied to the ink supply port 925 of the head 93 can be warmed by the warming block 96, the unevenness of the ink temperature in the head 93 is suppressed.

According to the present embodiment, printing can be performed on the medium 92 by a long nozzle row in which the two nozzle rows 921*a* are continuous by using the two heads 93.

Furthermore, according to the present embodiment, the nozzle 921 having a high nozzle usage frequency can be the nozzle 921 having a small variation in the ink ejection speed. Therefore, the usage frequency of the nozzle 921 having high ink ejection stability can be increased, and on the other hand, the usage frequency of the nozzle 921 having low ink ejection stability can be reduced, so that the ink can be stably ejected onto the medium 92.

Furthermore, according to the present embodiment, since the two heads 93 can have the same structure by arranging the two heads 93 point-symmetrically, an increase in device cost can be suppressed.

In addition, according to the present embodiment, even when using the UV ink, the image quality on the medium 92 can be improved.

The UV ink is adopted in the present embodiment, but the ink to be used is not limited to the UV ink. In the present embodiment, the two heads 93 having the same structure are arranged point-symmetrically, but two heads 93 having different structures may be used.

The invention claimed is:

1. An inkjet printer comprising:
an inkjet head that ejects ink;
a protrusion provided to protrude from the inkjet head and configured to circulate the ink to the inkjet head; and
an ink flow path portion that supplies the ink to the protrusion; wherein
the ink flow path portion includes an ink warming block that heats the ink, and
a conducting portion that is formed in the ink warming block itself or separately from the ink warming block and through which heat from the ink warming block is conducted is adjacently disposed outside the protrusion.

2. The inkjet printer as set forth in claim 1, wherein
the conducting portion is a separate body from the ink warming block,
the ink warming block includes a sealing member that seals an outside of the protrusion, and
the sealing member is positioned by the conducting portion.

3. The inkjet printer as set forth in claim 2, wherein the conducting portion is disposed to surround a periphery of the protrusion.

4. The inkjet printer as set forth in claim 1, wherein
the protrusion has a protruding flow path for circulating the ink therein, and
the ink warming block has a warming flow path for circulating the ink therein, and
a flow path cross-sectional area of the protruding flow path is smaller than a flow path cross-sectional area of the warming flow path.

5. The inkjet printer as set forth in claim 1, wherein the ink is a UV ink that cures when irradiated with ultraviolet light.

6. The inkjet printer as set forth in claim 2, wherein the ink is a UV ink that cures when irradiated with ultraviolet light.

7. The inkjet printer as set forth in claim 3, wherein the ink is a UV ink that cures when irradiated with ultraviolet light.

8. The inkjet printer as set forth in claim 4, wherein the ink is a UV ink that cures when irradiated with ultraviolet light.

9. An inkjet printer comprising:
an inkjet head that ejects ink;
a protrusion provided to protrude from the inkjet head and configured to circulate the ink to the inkjet head; and
an ink flow path portion that supplies the ink to the protrusion; wherein
the ink flow path portion includes an ink warming block that heats the ink,
the ink warming block includes a warming flow path for circulating the ink,
the protrusion includes a protruding flow path for circulating the ink therein, and
a flow path cross-sectional area of the protruding flow path is smaller than a flow path cross-sectional area of the warming flow path.

10. The inkjet printer as set forth in claim 9, wherein the ink is a UV ink that cures when irradiated with ultraviolet light.

11. An inkjet printer that performs printing by relatively moving a recording medium and an inkjet head that ejects ink onto the recording medium, wherein the inkjet head includes, a nozzle row in which a plurality of nozzles are arranged in a row in the same direction;

an ink supply port formed to be biased toward one end portion side of the nozzle row; and an ink warming heater that warms the ink;

the inkjet printer includes a pair of the inkjet heads; and the pair of inkjet heads are arranged so as to be shifted in position in the same direction such that compared to one end portions of the nozzle rows, the other end portions are proximate to each other.

12. The inkjet printer as set forth in claim 11, further comprising a warming block that is provided on an upstream side of each of the inkjet heads in a circulating direction of the ink and warms the ink supplied to the ink supply port.

13. The inkjet printer as set forth in claim 11, wherein when the pair of inkjet heads perform printing operation on the recording medium at the same time, the pair of inkjet heads have the other end portions proximate to each other so that respective nozzle rows of the pair of inkjet heads are regarded as a continuous nozzle row.

14. The inkjet printer as set forth in claim 11, further comprising a controller that controls a printing operation of the inkjet head; wherein the controller, causes each of the inkjet heads to perform printing on the recording medium by a multi-pass method of performing a plurality of main scans for a plurality of print passes with respect to each position of the recording medium, and causes each of the inkjet heads to eject ink droplets to a pixel designated by mask data using mask data, the mask data being data designating a pixel to which ink droplets are to be ejected in each of the plurality of print passes performed on each position of the recording medium; and in the mask data, a nozzle usage frequency on the other end portion side proximate to each other of the nozzle rows of the pair of inkjet heads becomes high, and a nozzle usage frequency on the one end portion side of the nozzle row becomes low.

15. The inkjet printer as set forth in claim 11, wherein the pair of inkjet heads have the same structure, and are arranged point-symmetrically with a phase differed by 180 degrees about a symmetry point in a plane where the inkjet heads and the recording medium relatively move.

16. The inkjet printer as set forth in claim 11, wherein the ink is an ultraviolet-curable ink that cures by ultraviolet light.

* * * * *